UNITED STATES PATENT OFFICE.

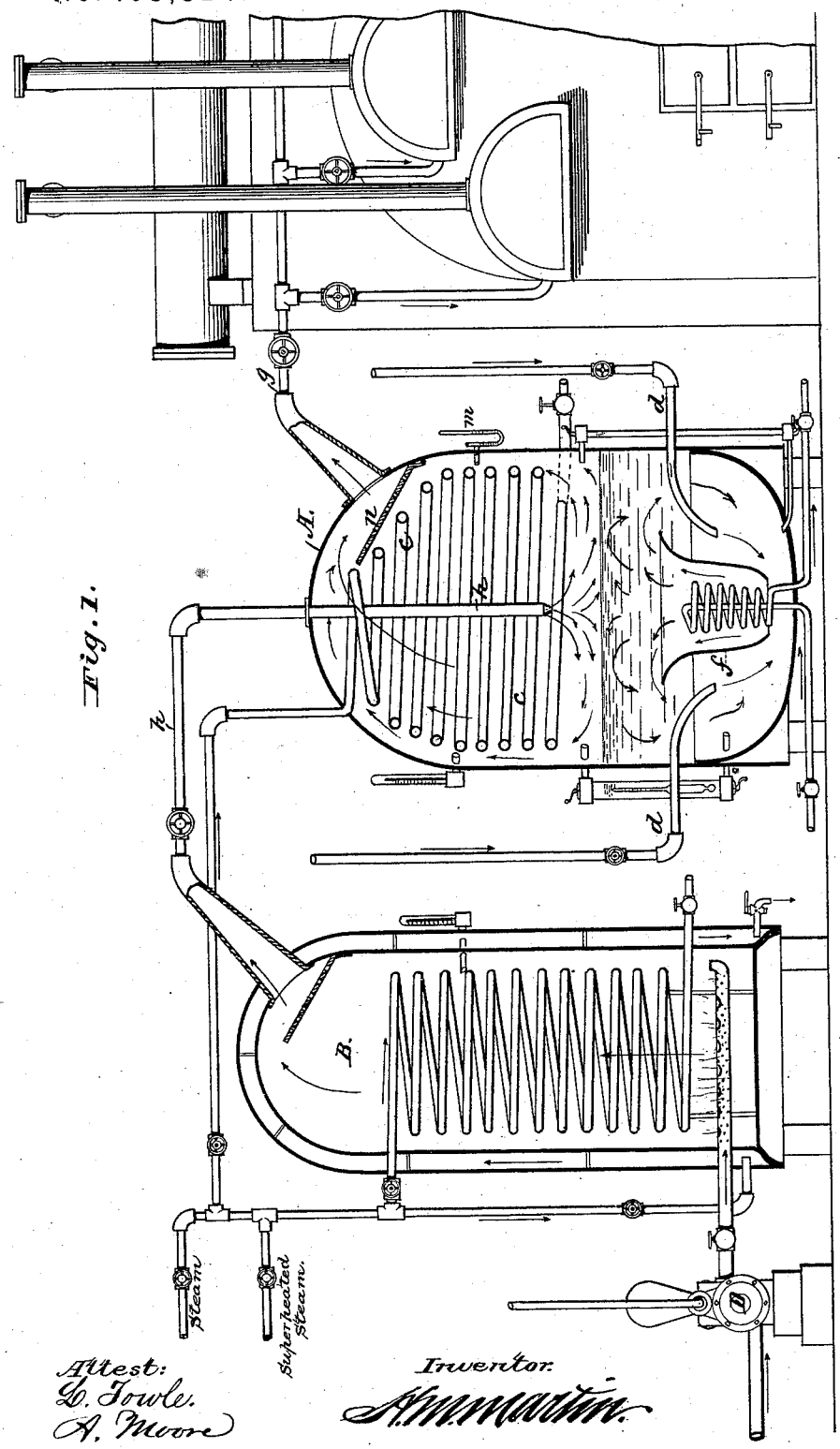

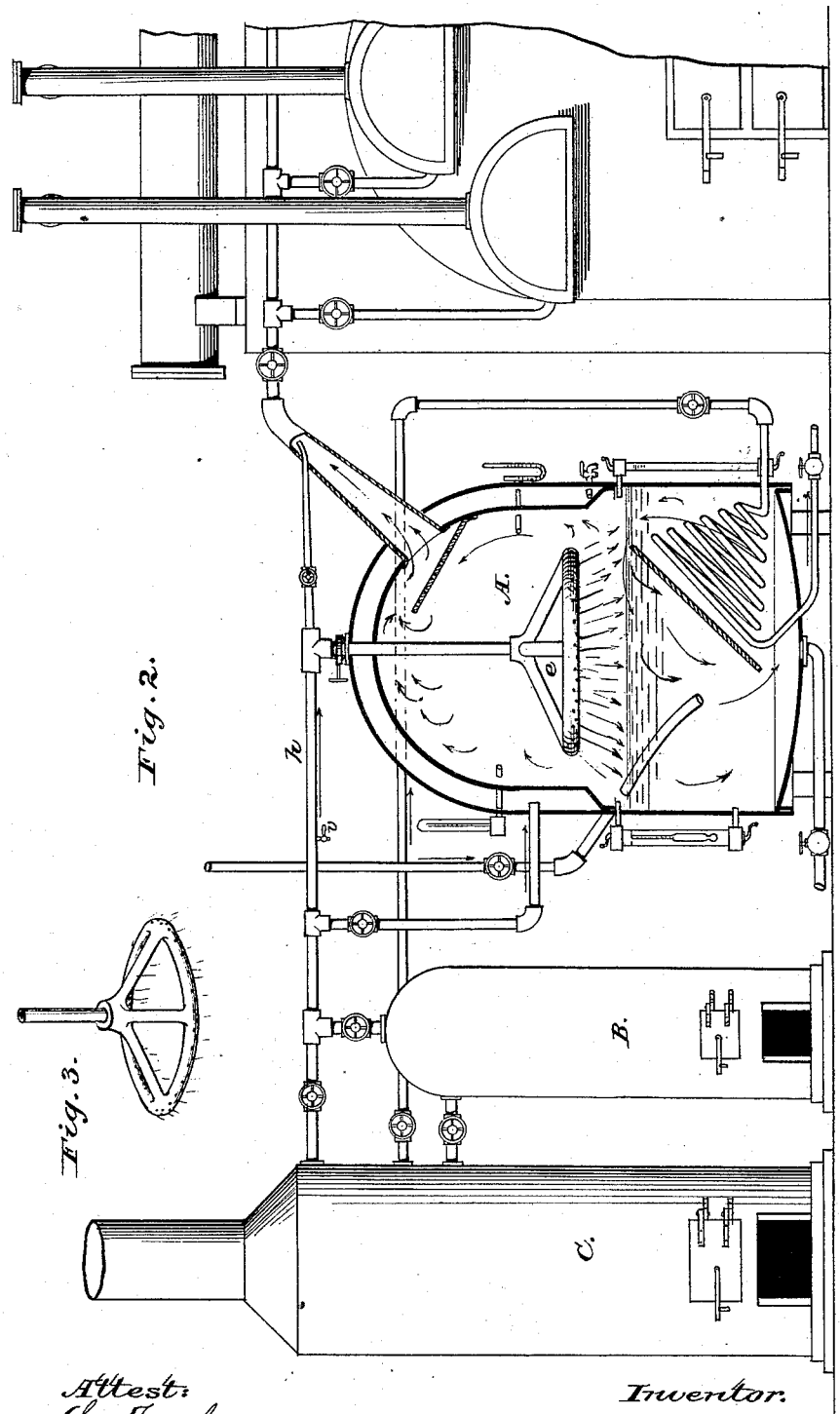

HENRY M. MARTIN, OF NEW YORK, N. Y.

IMPROVEMENT IN THE MANUFACTURE OF GAS AND OILS.

Specification forming part of Letters Patent No. 163,324, dated May 18, 1875; application filed May 5, 1875.

CASE B.

*To all whom it may concern:*

Be it known that I, HENRY M. MARTIN, of New York city, in the county of New York and State of New York, have invented certain new and useful Improvements in the Manufacture of Gas; and I do hereby declare that the following is a full, clear, and exact description thereof, which will enable others skilled in the art to which it pertains to make and use the same, reference being had to the accompanying drawing and to the letters of reference marked thereon, which form a part of this specification.

The object of this invention is to submit a fluid in a closed vessel to the action of the equivalent of a heated atmosphere of any designated temperature, so as to be able, at will, by regulating the temperature, to take by evaporation from the body submitted to this action any portion of it that is volatile at the heat to which it is subjected, either for the manufacture of oils of different gravities, or for the simultaneous manufacture of gas and such oils. This may be assisted by heating the liquid below its surface, or by keeping the liquid in constant motion by convective currents, so as constantly to present fresh portions at the surface and to the action of the heat, thus insuring thorough and rapid evaporation, or both. This may be carried out in many ways. It also consists in forcing or bringing steam, superheated steam or gas, or other aeriform fluid in a heated state, and of any designated temperature, into contact with hydrocarbon contained in a vessel heated as described, the hydrocarbon being kept in motion by convective currents, and the entering fluid either impinging upon or passing across the surface, so that any designated quantity or the whole shall be evaporated and mingled with the entering fluid, and led by suitable connections into a heated retort, where it will be converted into a fixed gas.

I have shown some forms of apparatus designed to carry out my invention, so far as it is adapted to the manufacture of gas; but the still alone, heated as described, may be used in connection with the ordinary worm or other condensing device, to separate liquids alone.

Figure 1 is a sectional view of an apparatus showing one form of embodiment of my invention. Fig. 2 is also a sectional view, but showing another form of embodiment.

In Fig. 1 I show a closed still, A, covered with asbestus or other non-conductor, and containing liquid hydrocarbon or other vaporizable substance, which is maintained at the level shown by means of supply-pipes $d$, provided with suitable valve to regulate the flow. This still is provided at its upper part with a steam-coil, $c$, which is supplied either with steam direct from a boiler, or with superheated steam from a superheater, by means of suitable pipes. The steam-coil, and through it the upper part of the still, is maintained at any desired heat by the greater or less admission of steam or superheated steam, controlled by valves in the steam-pipes. The still is also provided with a thermometer, a hydrometer, a pressure-gage, and a gage-glass.

The effect of the steam-coil in the still A, is, that the liquid in this closed vessel is submitted to the equivalent of a heated atmosphere of any designated temperature, whereby the operator is enabled at will, by regulating the temperature, which is determined by the thermometer, to take by evaporation from the liquid any amount of it that is volatile, at the heat to which it is subjected. The degree of heat required is determined by the hydrometer, for as the liquid becomes denser, in consequence of evaporation, the heat must be increased. In the manufacture of gas, this heat can be ascertained with ease and certainty, by conducting, by means of a small pipe, a portion of the gas directly from the main, over the retort, to the well-known Lowes improved jet-photometer, located near the still. Evaporation is assisted either by heating the liquid below its surface to a temperature lower than that of the radiated heat, by means of a coil or jacket not extending above the mean height of the liquid, or, by keeping the liquid in constant motion by convective currents, so as constantly to present fresh portions at the surface, and to the action of the heat. This motion of the liquid in the still, I produce as follows: Within the still A, about midway between its sides, below the surface of the liquid, and at some distance above the bottom of the vessel, I suspend, or in any convenient manner, fix a cup or casing, $f$. This cup is entirely open at its top, has a suitable opening below, and may be made of any material that is a poor conductor of heat, and which will withstand the action of the liquid in the vessel—for example, wood. The top of the sides of this cup, or its rim, is made flaring, and within the cup I arrange a steam-coil, or its equivalent. Steam is admitted to the coil. The liquid immediately surrounding the coil, and within the cup $f$, then becoming warmer than that below it, and around the exterior of the cup, rises, and its place is supplied by liquid passing through the opening in the bottom of the cup. By this means, as will be readily understood, two constant currents are produced, which pass upward and then outward over the top of the cup, down along its sides, and the sides of the still, and meet within the cup. The flaring rim of the cup, and the curved bottom and general form of the still and cup, facilitate this movement of the liquid. The hydrocarbon-supply pipes $d$, through which cold liquid is fed constantly or intermittingly, are also constructed and arranged, as shown, to aid in producing the current described. Gas or other fluid is brought by pump D, from any appropriate source and passed through the superheater B, which is a cylindrical vessel, surrounded by a steam-jacket, and containing a coil. These are connected with both a steam generator and superheater, by pipes having suitable valves. The gas or other fluid superheater is also provided with a thermometer, so that the temperature may be recognized and controlled.

In the superheater the gas or fluid is brought to any desired temperature to correspond to the density of the liquid in the still A in harmony with the radiated heat in the upper part of the still. From the superheater B the gas or other fluid passes through pipe $h$ into the still A, where it is impacted on the surface of the hydrocarbon liquid, which is of comparatively low temperature.

It is obvious that I may cause the hot gas or fluid to impinge upon the surface of the liquid from several pipes at once; or I may cause the heated gas or fluid to enter from the side and skim across the surface of the liquid without departing from the spirit of my invention.

As the impinging gas or other fluid enters the still A hot, it is essential that the liquid in the vessel should be kept at a lower temperature; but it need not of necessity be quite cold. This low temperature is partly insured by the constant evaporation from the surface of the liquid, and partly by the regulated supply through the pipes $d$.

From the closed vessel A the mingled gas or other fluid and vapors pass around the projection or screen $n$, and through the exit-pipe $g$, which is inclosed in a suitable jacket, or covered with suitable non-conducting substance, to suitable retorts, where they are converted into a fixed gas.

I sometimes prefer to separate the lighter from the heavier portions of whatever liquid may be in the still, either to make a gas or for other purposes, with or without the aid of any carrying fluid. In the latter case I rely solely on the effect of radiated heat upon the surface of the liquid; and by shutting off steam from the coil in the cup I may, if desired, stop the motion of the liquid. In connection with the radiated heat I may use, if desired, a simple heated coil located at the bottom of the still.

Sometimes I provide means for drawing the vapors from the vessel in which they are generated, and to do this I employ a suitable exhaust, such as a fan, a pump, or a steam-jet.

In Fig. 2 I show an apparatus embodying the same principle, but having the current-producing coil located within a partition at the side of the vessel C, and having but one hydrocarbon-supply pipe. This partition is so arranged that a current can pass freely under and over it, as indicated by arrows. The upper portion of the still in this case is provided with a steam-jacket instead of a coil. Either steam direct from the boiler A or superheated steam from the superheater B passes into this jacket. Upon the surface of the liquid in the still steam, superheated steam, gas, or other aeriform fluid is impinged through numerous perforations in the annulus $e$.

The remainder of the apparatus is substantially the same as in Fig. 1. Of course the upper portion of the still might be heated by hot air, or by direct fire-heat, and the form of still with its appurtenances shown in Fig. 1, or above-described, might occupy the place of that shown in Fig. 2, and vice versa.

I have described several modes of arranging steam-coils below the surface of the liquid, so as to produce convective currents. This I deem the best method; but it is obvious that a mechanical agitator might be made to take the place of the coils, and such would be an equivalent of the devices shown, and I include them as such in my invention.

I claim—

1. The process of separating liquids of different densities, which consists in evaporating off the lighter constituents, by subjecting the liquid in a closed vessel to the action of radiated heat of controllable temperature above its surface as set forth.

2. The process of evaporating liquids in a closed vessel, which consists in subjecting the liquid to the action of radiated heat above its surface, while at the same time it is heated below its surface as set forth.

3. The process of evaporating liquids in a closed still, which consists in subjecting the liquid to the action of radiated heat, above its surface, while at the same time it is kept in motion by convective currents, and fresh portions are continually presented at the surface, as described.

4. The process of manufacturing illuminating gas, which consists in evaporating a liquid hydrocarbon, in a closed still, by radiated heat above its surface, and conveying the vapors into heated retorts, where they are converted into a fixed gas, as set forth.

5. The process of manufacturing illuminating gas, which consists in bringing steam, superheated steam, or gas, or other fluid of graduated heat into contact with the surface of a liquid hydrocarbon in a closed vessel, the liquid being kept in constant motion, as described, and passing the commingled vapors, and gas, or steam, into heated retorts, substantially as specified.

6. The process of manufacturing illuminating gas, which consists in bringing steam, superheated steam, or gas, or other fluid of graduated heat, into contact with a liquid hydrocarbon in a closed vessel, the liquid being kept in constant motion, as described, and having its surface subjected to radiated heat to assist evaporation and prevent condensation of vapors, and then passing the resultant mixture into heated retorts, substantially as set forth.

7. The combination of a closed vessel and a steam-coil below the surface of the liquid to produce a current in the vessel, and a supply pipe or pipes, as and for the purpose set forth.

8. A closed vessel, or still, heated above the level of the contents and provided with a steam-coil below the level, substantially as and for the the purpose described.

In testimony that I claim the foregoing as my own, I affix my signature in presence of two witnesses.

H. M. MARTIN.

Witnesses:
THOMAS H. DUNHAM,
L. TOWLE.